(12) United States Patent
Adenuga

(10) Patent No.: US 9,294,921 B2
(45) Date of Patent: Mar. 22, 2016

(54) DEVICE FOR MOBILE COMMUNICATION

(71) Applicant: Money and Data Protection Lizenz GmbH & Co. KG, Bielefeld (DE)

(72) Inventor: Dominic Adenuga, Hamburg (DE)

(73) Assignee: Money and Data Protection Lizenz GmbH & Co. KG, Bielefeld (DE)

( * ) Notice: Subject to any disclaimer, the term of this patent is extended or adjusted under 35 U.S.C. 154(b) by 0 days.

(21) Appl. No.: 14/354,056

(22) PCT Filed: Oct. 30, 2012

(86) PCT No.: PCT/EP2012/071502
§ 371 (c)(1),
(2) Date: Apr. 24, 2014

(87) PCT Pub. No.: WO2013/064504
PCT Pub. Date: May 10, 2013

(65) Prior Publication Data
US 2015/0031337 A1    Jan. 29, 2015

(30) Foreign Application Priority Data
Oct. 31, 2011   (EP) .................................... 11187280

(51) Int. Cl.
*H04W 12/06* (2009.01)
*G06F 21/35* (2013.01)
*H04L 29/06* (2006.01)

(52) U.S. Cl.
CPC ............... *H04W 12/06* (2013.01); *G06F 21/35* (2013.01); *H04L 63/0853* (2013.01)

(58) Field of Classification Search
CPC ...... G06F 21/35; H04W 12/06; H04W 48/18; H04W 72/04; H04W 52/0222; H04W 76/048; G06Q 20/3567; A61F 5/566; G07C 9/0039
USPC .......... 455/554.2, 411, 450; 235/380; 726/20; 370/328
See application file for complete search history.

(56) References Cited

U.S. PATENT DOCUMENTS

| 2006/0288233 | A1 | 12/2006 | Kozlay |
| 2008/0004072 | A1* | 1/2008 | Yu .............................. 455/554.2 |
| 2011/0105081 | A1 | 5/2011 | Park et al. |
| 2011/0314539 | A1* | 12/2011 | Horton ........................... 726/20 |

FOREIGN PATENT DOCUMENTS

| WO | 97/39553 A1 | 10/1997 |
| WO | 98/25371 A1 | 6/1998 |
| WO | 2004/036513 A1 | 4/2004 |
| WO | 2007/072001 A1 | 6/2007 |

* cited by examiner

*Primary Examiner* — Phuoc H Doan
(74) *Attorney, Agent, or Firm* — Richard M. Goldberg

(57) ABSTRACT

A mobile device (16) includes a transceiver (40) for mobile communication and a controller (44) configured to execute an authentication function for authenticating a registered user of the device, in which the device (16) has only a single operating element (48), the functionality of the single operating element (48) is limited to activating and deactivating the authentication function, the authentication function has the transceiver logged-on to a mobile communications network and enabling a detection of an active state and/or a location of the mobile device via the mobile network, and the operating element (48) and the transceiver (40) constitute the only data input and output ports of the controller (44).

14 Claims, 4 Drawing Sheets

DEVICE FOR MOBILE COMMUNICATION

BACKGROUND OF THE INVENTION

The invention relates to a mobile device comprising a transceiver for mobile communication and a controller configured to execute an authentication function for authenticating a registered user of the device.

In transactions in which a user communicates with a remote transaction partner via a communication channel such as the Internet, it is important to assure that an individual that identifies itself as an authorised user is actually the person it alleges to be. For example, when a user makes an online bank transaction in which he identifies himself as the owner of a certain account and requests that an amount of money is remitted to some other account, an authentication method is needed for verifying the identity of the requestor. Other examples of transactions where an authentication of the user should be required are transactions in which a user asks for online access to a database or other online services that involve sensitive data. Another example would be a transaction for operating a door opener that provides physical access to a secure area or room.

WO 98/25371 A1 discloses a mobile device of the type indicated above, wherein the authentication function includes prompting the user to confirm the transaction request.

US 2006/288233 A1 discloses a mobile device with a biometric authentication function.

WO 2007/072001 A1 discloses an authentication method and a mobile device wherein an authentication device responds to the transmission of a user identification with sending an authentication token to a terminal from which the transaction has been requested. This token may for example be encoded in a digital image to be displayed on a display of the terminal. The authentication function in the mobile device is configured to capture this digital image and send it back to the authentication device via the mobile communication channel.

In this way, it can be confirmed that the person carrying the mobile device, e.g. a mobile telephone, is actually present at the location of the terminal from which the transaction has been requested. Thus, as long as the user is in control of his mobile device, the authentication method assures that no third party can fake the identification data of this user and perform any transactions in his place.

SUMMARY OF THE INVENTION

It is an object of the invention to provide a mobile device that is suitable for authentication purposes and is of low complexity and easy to handle.

In order to achieve this object, the mobile device according to the invention has only a single operating element, the functionality of said single operating element is limited to activating and deactivating the authentication function, said authentication function consists in having the transceiver logged-on to a mobile communications network and enabling a detection of an active state and/or a location of the mobile device via the mobile network, and the operating element and the transceiver constitute the only data input and output ports of the controller.

This device can be used, for example, for an authentication method wherein the authentication function is implemented in the mobile device is normally inactive and is activated by the user only preliminarily for the transaction, and wherein the authentication device authenticates the user to a transaction only when a predetermined time relation exists between the transmission of the user identification and the active state of authentication function.

In this method, the complexity of the authentication function can be reduced significantly. In the extreme, all that has to be required from the authentication function is to permit the authentication device to detect whether or not this function is active. Likewise, the only activity that is required from the user for authentication purposes is to activate the authentication function at a suitable timing for the transaction. Once the active state of the authentication function has been detected, this function is returned into the inactive state, either automatically or manually by operating the operating element once again. The "predetermined time relation" may imply that the authentication function is active at the moment at which the user identification is sent from the terminal. As an alternative, the predetermined time relation may imply that the authentication function is activated within a certain (preferably short) time window after the transmission of the user identification or, conversely, that the user identification is transmitted within a specified time window after the authentication device has detected that the authentication function is active.

Since the authentication function is normally inactive, the authentication will almost certainly fail when a third party fraudulently identifies itself as the user in order to initiate a transaction. Then, the authentication would be successful only in the very unlikely event that the true user happens to activate the authentication function of his mobile device just in the right moment. Even in this unlikely case the fraud could be detected because the user will only activate the authentication function when he wants to make a transaction himself. Consequently, the authentication device would detect a coincidence between one activation of the authentication function and two transaction requests (normally launched from different terminals), and this would cause the authentication device to have the transactions denied or reversed. Thus, notwithstanding the low complexity, the method according to the invention offers a high level of security.

As an alternative or in addition, the authentication device may check whether there is a predetermined spatial relation between the mobile device and the terminal.

More specific optional features of the invention are indicated in the dependent claims.

It is preferred that the mobile device does not have to have any specific hardware for capturing or outputting information. All that is required from the mobile device is that it can be activated for a certain (preferably short) period of time and is capable of connecting to a mobile communications network where it has an address that is linked to the identification data of the user, so that the authentication device, when it receives the user identification from the terminal, is capable of checking whether the authentication function of the mobile device with the associated address is active. To that end, it is not even necessary that there is any actual communication between the authentication device and the mobile device. For example, when the mobile device has a mobile telephone (GSM) transceiver, the activation of the authentication function may just consist of activating that transceiver, so that it connects to the nearest Base Station Subsystem (BSS) of the mobile network. As a result, the mobile device will be identified by its device identifier (IMSI), and information on the active state of the mobile device and on the GSM-cell in which it is located will be entered into a Home Location Register (HLR) of the mobile network. Thus, the authentication device may check the active or inactive state of the mobile device and may locate the same just by querying the HLR.

The mobile device may have a plurality of mobile addresses (e.g. mobile telephone numbers) and may even be capable of communicating via a plurality of different mobile networks. In that case, it is preferable that each mobile address is assigned to a different type of transaction (e.g. one telephone number for authenticating bank transactions and another one for authenticating access to a data network), and the authentication function or a plurality of authentication functions are adapted to be activated and deactivated separately for each type of transaction.

In a modified embodiment, for enhanced safety, a plurality of mobile addresses may be assigned to one and the same type of transaction, and the mobile device and the authentication device use identical algorithms for changing from time to time the mobile address that is to be used for authentication purposes.

Optionally, the device according to the invention may have a positioning function permitting to locate the mobile device, and optionally a function for sending the detected location via the transceiver to the authentication device.

It may be advantageous when there is no communication whatsoever between the mobile device and the authentication device, nor between the mobile device and the terminal or any other entity, because, when there is no communication, there is no possibility that this communication may be tapped and may be used to outsmart the security system.

Preferably, the electronic components of the device are protected against both electronic and mechanical access.

The device may also have a self-destruction function configured to be activated by an attempt of enforced access.

These features will assure that nobody can enforce access to the data processing system in order to read-out program code or data that are stored therein and might be used for imitating the mobile device.

For example, the self-destruction function may be triggered by an event in which the body of the device is broken to expose the data processing system (chip) and may assure that, in that event, or the program code and the data are erased.

BRIEF DESCRIPTION OF THE DRAWINGS

Embodiments of the invention will now be described in conjunction with the drawings, wherein.

DETAILED DESCRIPTION

Figure 1:
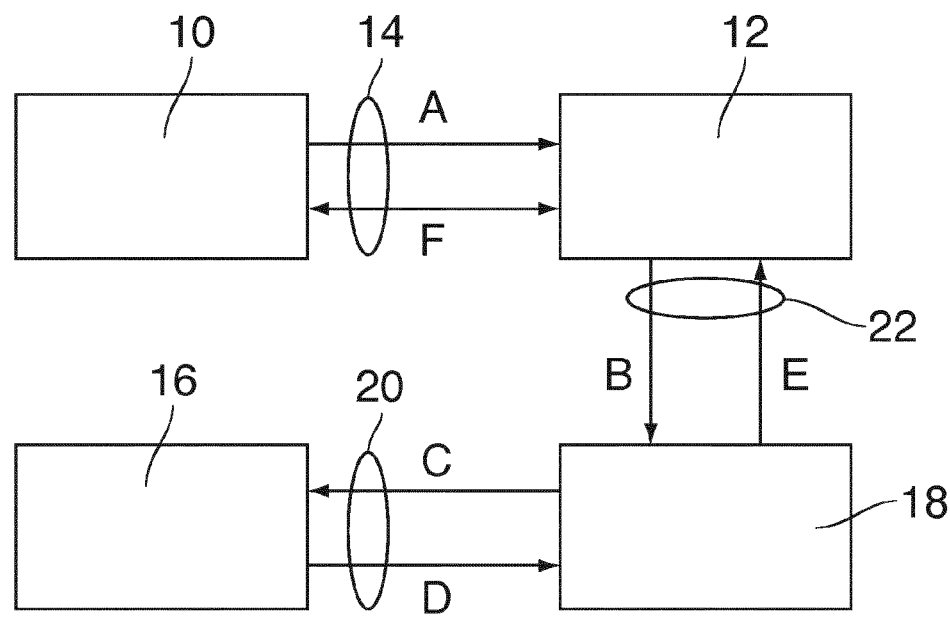
FIG. 1 is a block diagram illustrating an authentication method.

As is shown in FIG. 1, a transaction terminal 10, e.g. a banking machine, communicates with a remote transaction partner 12, e.g. a bank, via a first communication channel 14 which may be a wireline or wireless channel. A mobile device 16 communicates with an authentication device 18 via a second communication channel 20 which preferably includes a wireless link, e.g. a mobile telephone network. The authentication device 18 may be installed in the premises of the transaction partner 12 or may be configured as a separate entity communicating with the transaction partner 12 via a third communication channel 22.

The mobile device 16 is carried by a user who is registered as a subscriber to the mobile telephone network forming the communication channel 20. The authentication device 18 is formed by data processing hardware and software and includes a database that stores a user ID of the user and the mobile telephone number (or any another mobile address) of the mobile device 16 of that user.

It shall now be assumed that the user wants to make a bank transaction via the terminal 10. To that end, the user operates the terminal 10 and sends a transaction request to the transaction partner 12. That request includes a step A of transmitting the user-ID to the transaction partner 12. In a step B, the transaction partner 12 forwards the user-ID to the authentication device 18. Thereupon, the authentication device 18 retrieves the mobile telephone number and/or the IMSI of the user and contacts the mobile device 16 or at least the mobile telephone network to check whether or not the mobile device 16 or a certain authentication function implemented therein is active (step C). When it is confirmed in step D that the authentication function is active, the authentication device 18 sends an authentication signal to the transaction partner 12 (step E). The authentication signal preferably includes the user-ID that has been sent in step B and informs the transaction partner that this specific user is authenticated to the requested transaction. Thereupon, the transaction between the user and the transaction partner 12 will be performed via the terminal 10 (step F).

Figure 2:
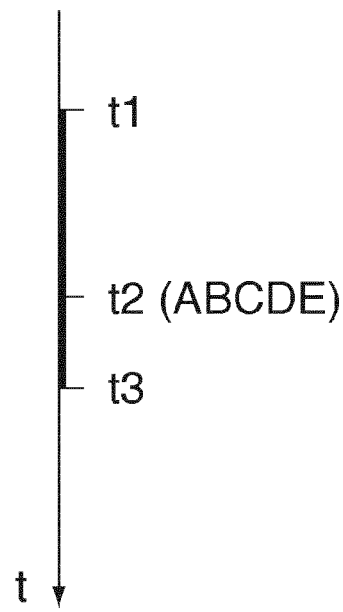
FIG. 2 is a time diagram illustrating the authentication method.

FIG. 2 shows a time diagram illustrating one embodiment of the authentication method that has been outlined above.

At a time t1, the user who wants to request a transaction activates his mobile device 16. At a time t2, the sequence of steps A-B-C-D-E is performed to authenticate the user. Since, at this time, the mobile device 16 is actually active, the authentication is successful. Then, at a time t3, the mobile device 16 is deactivated either manually or automatically by a self-deactivation function implemented in the device 16. As another alternative, a command to deactivate the mobile device 16 may be sent by the authentication device 18 when the user has been authenticated successfully.

Preferably, the time interval from t1 to t3 in which the mobile device 16 is active will be relatively small, e.g. only a few minutes or seconds. When it is found in steps C and D that the mobile device 16 (or at least the authentication function thereof) is not active, it must be assumed that the person who is identified by the user-ID and is in control of the mobile device 16 does not actually want to request a transaction, and it must therefore be concluded that the user-ID sent in step A has been faked by an unauthorised third party. In that case, the authentication is denied in step E.

In this embodiment, the authentication process may optionally include additional steps of communication between the mobile device 16 and the authentication device 18. Such communication protocols for authentication purposes are generally known in the art.

For example, the mobile device may use a pre-programmed algorithm to generate an identification code and send it to the authentication device. The pre-programmed algorithm is known to the authentication device and is used there to verify the identity of the mobile device, independently of its IMSI. The identification code may for example be a number from a list of "TAN" numbers that is stored in the mobile device, the algorithm being configured such that each number is used only once. On the other hand, in order to permit an infinite number of transactions, the identification codes may be generated dynamically, possibly with use of data such as the current date or the time of the day. In yet another embodiment, the identification code may be an encrypted password or an encrypted combination of a password with time and date data, the encryption being based on a dynamically varied encryption parameter that is sent from the authentication device.

The authentication will be successful only when the authentication device finds the identification code to be valid. In any case, the authentication will be denied whenever it is found that the authentication function of the mobile device 16 is not active at the right time.

Figure 3:
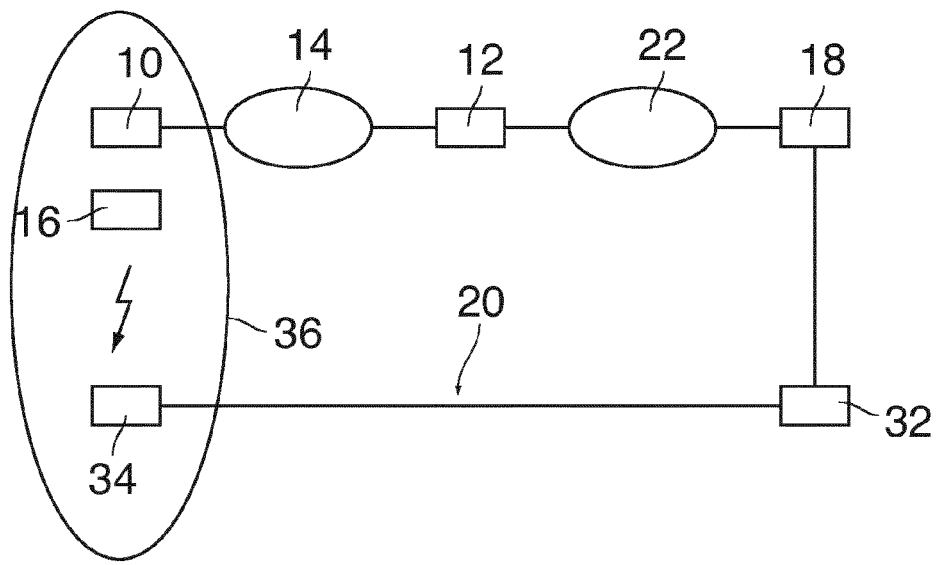
FIG. 3 is a block diagram illustrating an example of a communication scheme for an embodiment of the invention.

FIG. 3 illustrates a communication scheme in which the first communication channel 14 and the third communication channel 22 are formed by the Internet, for example. The authentication device 18 is installed remote from the transaction partner 12 and is run by a Trusted Third Party that is independent from the transaction partner 12. The second communication channel 20 is formed by a mobile telephone network including a Home Location Register (HLR) 32 and a plurality of Base Station Subsystems (BSS) 34 only one of which has been shown in FIG. 7 and each of which serves one or more mobile telephone cells 36.

In this embodiment, the authentication device 18 identifies the mobile cell 36 in which the device 16 is currently located, and the user is authenticated to the transaction only when the mobile device 16 is found to be located in the cell 36 that accommodates also the terminal 10 from which the transaction has been requested. Thus, a false authentication is possible only when the user-ID is sent from a certain terminal 10 at the right moment and, additionally, the mobile device 16 of the true user happens to be located in the vicinity of that terminal 10.

If the mobile network 20 supports Location Based Services (LBS), then the current location of the mobile device 16 may be identified with much higher spatial resolution, and a successful authentication may require that the mobile device 16 is only a few hundreds or a few tens of meters apart from the terminal 10.

In yet another embodiment, the mobile device 16 may include a GPS function, and the authentication function may be configured to send the current GPS coordinates of the mobile device 16 to the authentication device 18.

Figure 4:
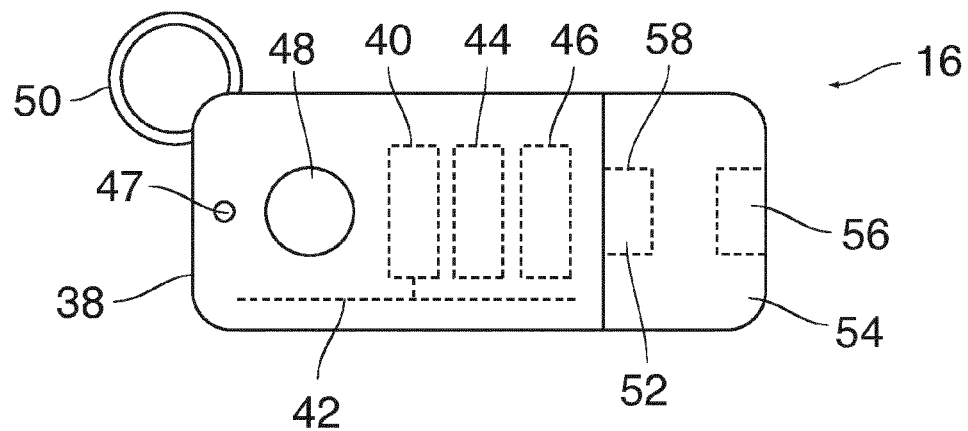
FIG. 4 is a view of a mobile device according to the invention.
Figure 5:
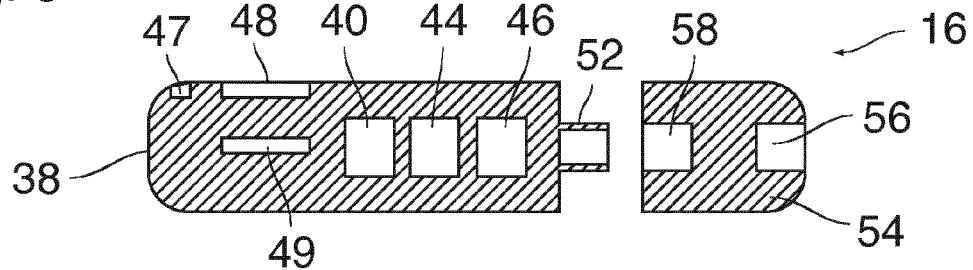
FIG. 5 is a sectional view of the device shown in FIG. 4.

FIGS. 4 and 5 show an example of a mobile device 16 according to the invention that is dedicated to the authentication purpose. This device 16 has a single casing or body 38 which accommodates a wireless transceiver 40 (e.g. a mobile telephone transceiver) with an antenna 42, an electronic controller 44 (data processing system), a rechargeable battery 46, and a battery charge control lamp 47.

A device identifier (ISMI) is permanently stored in the controller 44 which may have the only function to activate and deactivate the transceiver 40 so that the latter may connect and identify itself to the nearest BSS 34. Only a single ON-switch 48 (operating element) is formed in the surface of the body 38. The ON-switch 48 may simply be formed by a button, so that the user may activate the authentication function (i.e. the transceiver 40) by pressing the button. As an alternative, the ON-switch may be formed by an input device for inputting some secret code (e. g. a PIN) or by a biometric sensor such as a fingerprint sensor or iris recognition sensor, so that the transceiver will be activated only when the identity of the user has been confirmed. As is shown in FIG. 5, a buzzer 49 is provided for giving an acoustic feedback when the authentication function has been activated successfully by pressing the ON-switch 48.

The body 38 has relatively small dimensions and is attached to a key ring 50 so that it may conveniently be carried along at a bunch of keys of the user.

Projecting from one end of the body 38 is a male socket 52 (e.g. an USB socket or micro-USB socket) which is connected to the battery 46, so that the battery may be recharged by plugging the device 16 into a female USB socket of a computer, a mobile phone or the like. The male socket 52 is covered and protected by a removable cap 54. In the example shown, the cap 54 forms a female socket 56 that is open to the outside and is internally connected to another female socket 58 that accommodates the male socket 52. Thus, the battery 46 may also be recharged by plugging a male USB or micro-USB connector of a power source into the socket 56.

As is shown in FIG. 5, the body 38 is a massive plastic body with the transceiver 40, the controller 44 and the battery 46 cast therein. Thus, physical access to these components, especially the transceiver 40 and the controller 44, is not possible without destroying the body 38.

In a modified embodiment, the controller 44 may include a memory with program code and data for more complex authentication functions, e. g. a function for generating and transmitting a device identification code, as has been described above. However, the controller has no electronic contacts that would provide a possibility to read-out the contents of the memory. Optionally, the controller 44, especially the memory thereof, may be configured such that all stored contents are erased as soon as the body 38 is broken and someone tries to remove the controller therefrom. Thus, the authentication data that may be stored in the memory of the controller 44 are reliably protected against copying.

Figure 6:
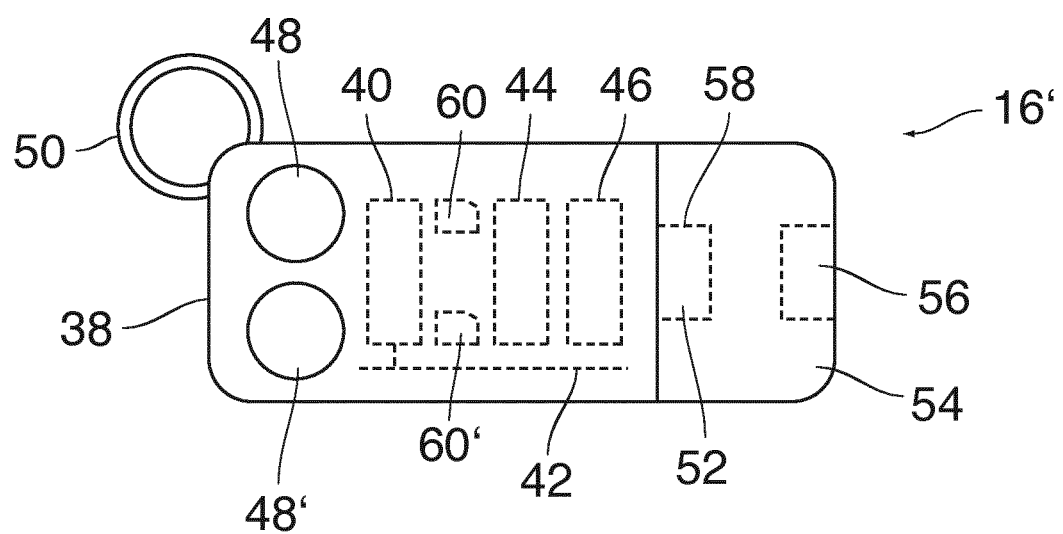
FIG. 6 is a view of a mobile device according to another embodiment.

FIG. 6 shows an example of a mobile device 16' that is dedicated only to authentication purposes but supports two different authentication procedures for two different types of transaction. The device 16' has two SIM cards 60, 60' (or other memory devices) which store different sets of access data. Thus, each of the SIM cards has its own mobile telephone number which may even belong to two different mobile networks. Each mobile telephone number is assigned to a different one of the types of transaction. The two mobile numbers may be registered in two different authentication devices or my be registered in the same authentication device along with information specifying the type of transaction for which they shall be used.

Further, the device 16' has two buttons 48 and 48' for selectively activating one of the two SIM cards 60, 60'. Thus the user may specify the type of transaction he wants to perform by pressing either the button 48 or the button 48' in order to activate the related SIM card and, implicitly, the related authentication function. The controller 44 will then automatically deactivate the authentication function (SIM card) after a certain time interval.

As an alternative, the device 16' may have a plurality of SIM cards (or other Mobile Network Identification Numbers such as IMSI, phone No. and the like) but only a single switch 48 for activating the authentication function. Then, a certain algorithm that is stored in the controller 44 is used for deciding which of the SIM cards is to be used, e.g. depending upon the date, the time of the day or the like. An identical algorithm is used in the authentication device 18, and a successful authentication is possible only when both the mobile device and the authentication device use the same contact data associated with the determined SIM card.

Figure 7:
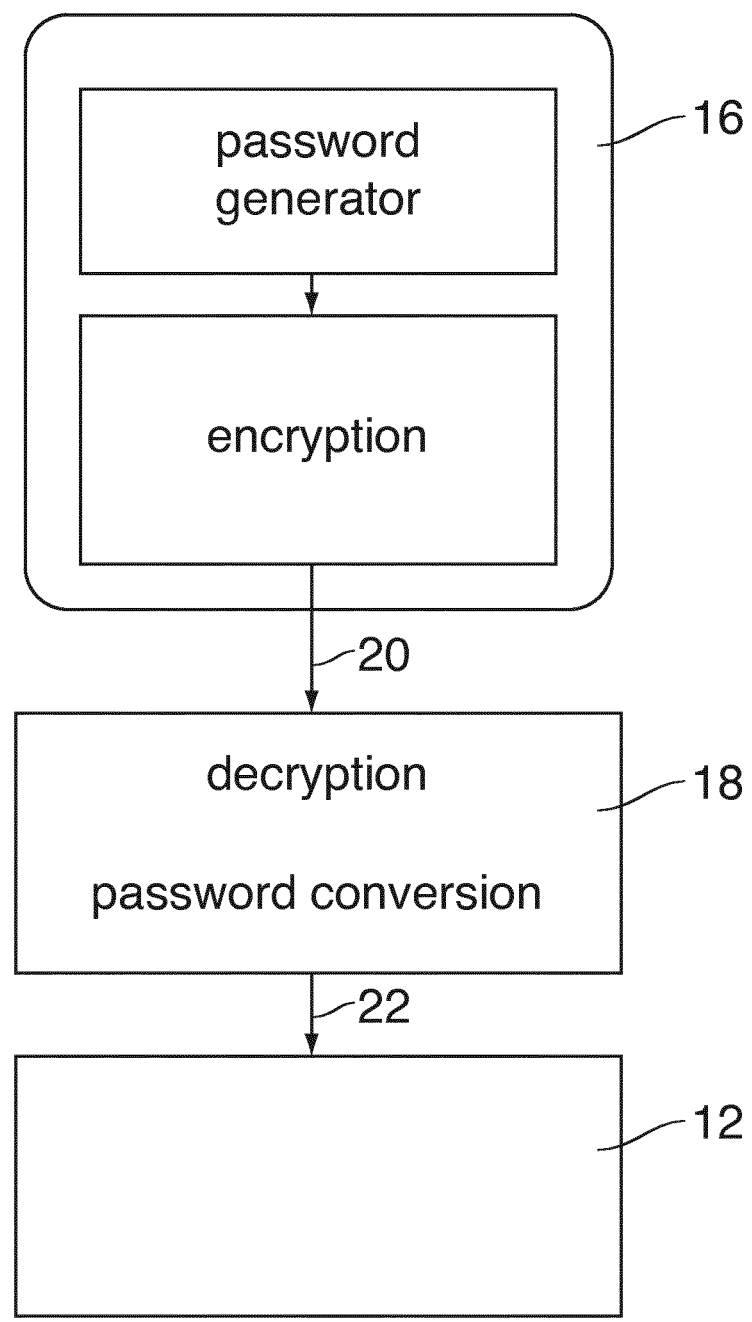
FIG. 7 is a simplified diagram illustrating a modification of the authentication method.

FIG. 7 illustrates a useful modification that may be implemented in any of the authentication methods discussed above. Normally, the request for authentication sent from the terminal 10 to the transaction partner 12 will include not only the user ID but also a password showing that the user is actually entitled to the service he is requesting. However, in the embodiment shown in FIG. 7, this password is not transmitted via the first communication channel 14 but via the second or third communication channel. This reduces the risk of the combination of password and user ID being captured by tapping one of the communication channels.

In the embodiment shown in FIG. 7, the mobile device includes a password generator that generates a dynamically changing password according to a certain algorithm that is mirrored by the authentication device 18. Thus even if the IMSI has been captured by a IMSI catcher, the fraud can still be detected because of a mismatch of the passwords generated in the mobile device 16 and the authentication device 18, respectively. Preferably, the password sent via the communication channel 20 is encrypted. The decrypted password may then be passed on to the transaction partner 12.

In the example shown, however, the password generated in the mobile device is a universal password that is used for each authentication process regardless of the transaction partner and the type of service involved. Then, based on information on the specific type of service, as transmitted from the transaction partner 12 in step B, if the authentication is successful, the authentication device 18 automatically converts the universal password into a specific password that is pertinent for the type of service.

What is claimed is:

1. A mobile device comprising:
   a transceiver for mobile communication,
   a controller configured to execute an authentication function for authenticating a registered user of the device,
   only a single operating element, and functionality of said single operating element is limited to activating and deactivating the authentication function, said authentication function includes having the transceiver logged-on to a mobile communications network and enabling a detection of at least one of an active state and a location of the mobile device via the mobile network,
   the operating element and the transceiver constitute the only data input and output ports of the controller,
   a rechargeable battery and a connector for connecting the battery to a voltage source,
   wherein the connector is a male connector covered by a removable cap that includes two female connectors permitting to connect the male connector to a voltage source via one of the female connectors while the other of the female connectors is coupled to the male connector.

2. A system for authenticating a transaction, comprising:
   a transaction terminal for performing a transaction with a remote transaction partner,
   a mobile device separate and apart from the transaction terminal for providing an authentication signal used for approving the transaction at the transaction terminal with the remote transaction partner, and
   an authentication device separate and apart from the transaction terminal and the mobile device, for approving the transaction at the transaction terminal with the remote transaction partner in response to the authentication signal from the mobile device,
   the mobile device including:
   a first casing,
   a transceiver in the first casing for providing mobile communication with, and sending the authentication signal to, the authentication device via a mobile communications network,
   a controller in the first casing configured to execute an authentication function for authenticating a registered user of the mobile device and producing said authentication signal,
   only a single operating element in the first casing for only activating and deactivating the authentication function by causing the transceiver to log-on to the mobile communications network and enabling a detection of at least one of an active state and location of the mobile device via the mobile communications network, and
   the operating element and the transceiver constitute the only data input and output ports of the controller.

3. The system according to claim 2, wherein the mobile device further includes a rechargeable battery and a connector for connecting the battery to a voltage source.

4. The system according to claim 3, wherein the mobile device further includes a display for indicating the charge state of the battery.

5. The system according to claim 3, wherein the connector is one of
   a USB connector and
   a micro-USB connector.

6. The system according to claim 2, wherein the controller is configured to automatically deactivate the mobile device a certain time interval after the operating element has been operated.

7. The system according to claim 6, wherein the authentication function consists only of activating the transceiver in response to the operating element being operated.

8. The system according to claim 2, wherein the mobile device further includes a positioning function for wireless detection of its own position, wherein said authentication function includes a function of sending a detected location via the transceiver.

9. The system according to claim 8, wherein the mobile device further includes a self-destruction function configured to be activated by an attempt of enforced access.

10. The system according to claim 2, wherein the mobile device further includes a body that encapsulates at least the controller and prevents non-destructive access thereto.

11. The system according to claim 2, wherein the mobile device further includes a memory for storing a password to be sent via the mobile network.

12. The system according to claim 2, wherein the mobile device further includes a processing system for generating a password to be sent via the mobile network.

13. The system according to claim 2, wherein the mobile device further includes a storage for a plurality of mobile addresses, wherein the controller is configured to select one out of the plurality of mobile addresses according to a predetermined algorithm.

14. The system according to claim 2, wherein the mobile device further includes an acoustic transducer for providing an acoustic feedback signal upon at least one of activation and deactivation of the authentication function.

* * * * *